United States Patent
Jones et al.

(10) Patent No.: US 9,745,408 B2
(45) Date of Patent: Aug. 29, 2017

(54) RIGID FOAM

(71) Applicant: BASF SE, Ludwigshafen (DE)

(72) Inventors: Charles Elwood Jones, Detroit, MI (US); Todd William Wishneski, Missouri City, TX (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/760,892

(22) PCT Filed: Jan. 14, 2014

(86) PCT No.: PCT/US2014/011464
§ 371 (c)(1),
(2) Date: Jul. 14, 2015

(87) PCT Pub. No.: WO2014/113379
PCT Pub. Date: Jul. 24, 2014

(65) Prior Publication Data
US 2015/0353672 A1    Dec. 10, 2015

Related U.S. Application Data

(60) Provisional application No. 61/752,483, filed on Jan. 15, 2013.

(51) Int. Cl.
| | |
|---|---|
| C08G 18/76 | (2006.01) |
| C08G 18/34 | (2006.01) |
| C08G 18/18 | (2006.01) |
| C08G 18/66 | (2006.01) |
| C08G 18/16 | (2006.01) |
| C08G 18/20 | (2006.01) |
| C08G 101/00 | (2006.01) |

(52) U.S. Cl.
CPC ....... *C08G 18/7685* (2013.01); *C08G 18/161* (2013.01); *C08G 18/1858* (2013.01); *C08G 18/2036* (2013.01); *C08G 18/34* (2013.01); *C08G 18/6607* (2013.01); *C08G 18/7614* (2013.01); *C08G 2101/0025* (2013.01)

(58) Field of Classification Search
CPC .............. C08G 18/161; C08G 18/1858; C08G 18/2036; C08G 18/34; C08G 18/6607; C08G 18/7614; C08G 18/7685; C08G 2101/0025
See application file for complete search history.

(56) References Cited

U.S. PATENT DOCUMENTS

| | | |
|---|---|---|
| 3,644,232 A | 2/1972 | Bernard et al. |
| 3,657,161 A | 4/1972 | Bernard et al. |
| 3,981,829 A | 9/1976 | Cenker et al. |
| 3,994,839 A | 11/1976 | Cenker et al. |
| 4,029,610 A | 6/1977 | Narayan et al. |
| 4,166,164 A | 8/1979 | Cenker et al. |
| 4,344,855 A | 8/1982 | Schafer et al. |
| 5,214,076 A | 5/1993 | Tideswell et al. |
| 5,621,051 A * | 4/1997 | Okutani ............... C08G 18/168 521/155 |
| 5,684,057 A | 11/1997 | White, III et al. |
| 2007/0043132 A1 | 2/2007 | Kiso et al. |
| 2008/0207787 A1 | 8/2008 | Clatty et al. |

FOREIGN PATENT DOCUMENTS

| | | |
|---|---|---|
| CN | 1201472 A | 12/1998 |
| EP | 0 716 107 A2 | 6/1996 |
| GB | 1 513 807 | 6/1978 |
| JP | H 07-102031 A | 4/1995 |
| WO | WO 2012/004229 A1 | 1/2012 |

OTHER PUBLICATIONS

International Search Report for Application No. PCT/US2014/011464 dated Jun. 4, 2014, 4 pages.
Air Products, "Polyurethane Additives Product Bulletin DABCO DC193 Surfactant", Feb. 2011, 2 pages.
Air Products, "Polyurethane Additives Product Bulletin DABCO BL-11 Catalyst", 2012, 2 pages.
Air Products, "Polyurethane Additives Product Bulletin Polycat 41 Catalyst", 2012, 2 pages.
Air Products, "Material Safety Data Sheet-MSDS No. 300000008669, DABCO BL-11 Catalyst," 2012, pp. 1-8.
Air Products, "Material Safety Data Sheet-MSDS No. 300000008684, DABCO DC193 Surfactant," 2005, pp. 1-6.
Air Products, "Material Safety Data Sheet-MSDS No. 300000008784, Polycat 41 Catalyst," 2012, pp. 1-8.
BASF, "Technical Bulletin No. 74 Isocyanate", Aug. 2001, 1 page.
BASF, "Technical Bulletin No. 78 Isocyanate", Aug. 2001, 1 page.
BASF, "Technical Bulletin No. 233 Isocyanate", Aug. 2001, 1 page.
BASF, "Technical Bulletin No. 234 Isocyanate", Aug. 2001, 1 page.
BASF, "Technical Bulletin No. 241 Isocyanate", Aug. 2001, 1 page.
BASF, "Technical Bulletin No. 245 Isocyanate", Aug. 2001, 1 page.
BASF, "Technical Bulletin No. 255 Isocyanate", Aug. 2001, 1 page.
BASF, "Technical Bulletin No. 261 Isocyanate", Aug. 2001, 1 page.
BASF, "Technical Bulletin No. 266 Isocyanate", Aug. 2001, 1 page.

(Continued)

*Primary Examiner* — John Cooney
(74) *Attorney, Agent, or Firm* — Howard & Howard Attorneys PLLC

(57) ABSTRACT

A rigid foam having increased flame retardance comprises the reaction product of an isocyanate component and an isocyanate-reactive component. The isocyanate component and an isocyanate-reactive component are reacted in the presence of an isocyanurate catalyst component and a carbodiimide catalyst component. The isocyanurate catalyst component comprises 1,3,5-tris(3-(dimethylamino)propyl)-hexahydro-s-triazine and the carbodiimide catalyst component comprises 3-methyl-1-phenyl-2-phospholene-1-oxide. A method of forming the rigid foam on a surface comprises the steps of providing the isocyanate component, providing the isocyanate-reactive component, providing the isocyanurate catalyst component, providing the carbodiimide catalyst component, and spraying the isocyanate component, isocyanate-reactive component, isocyanurate catalyst component, and carbodiimide catalyst component onto the surface to form the rigid foam on the surface.

19 Claims, No Drawings

(56) References Cited

OTHER PUBLICATIONS

BASF, "Technical Bulletin Lupranate M10 Polymethylene Polyphenylpolyisocyanate", Aug. 2001, 1 page.
BASF, "Technical Bulletin Lupranate M20 Isocyanate Polymethylene Polyphenylpolyisocyanate", Jan. 2008, 1 page.
BASF, "Technical Bulletin Lupranate M20S Polymethylene Polyphenylpolyisocyanate", Aug. 2001, 1 page.
BASF, "Technical Bulletin Lupranate M70R Polymethylene Polyphenylpolyisocyanate", Aug. 2001, 1 page.
BASF, "Technical Bulletin Lupranate M200 Polymethylene Polyphenylpolyisocyanate", Aug. 2001, 1 page.
BASF, "Safety Data Sheet—Lupranate M10 Isocyanate", 2005, pp. 1-7.
BASF, "Safety Data Sheet—Lupranate M20 Isocyanate", 2011, pp. 1-10.
BASF, "Safety Data Sheet—Lupranate M70L Isocyanate", 2008, pp. 1-7.
BASF, "Safety Data Sheet—Lupranate M70R Isocyanate", 2008, pp. 1-7.
Carpenter Co. Chemicals Division, "Technical Data Sheet CAS No. 52019-35-9, CARPOL MX-470, Polyether Polyol", Jun. 2006, 2 pages.
Luna, Jose et al., "High Functional Aromatic Polyester Polyols for PUR Systems", 2006, pp. 71-83.
Graco/Gusmer, "GX-7 Plural-Component Spray Guns", 2005, 2 pages.
Madison Chemical Industries, "Plural Component Coating Application Equipment—Basic Configuration Description", Mar. 2010, 6 pages.
Sigma-Aldrich, "3-Methyl-1-Phenyl-2-Phospholene 1-oxide", 2011, 2 pages.
Oxid L.P., "Product Information Bulletin: TEROL 305—Aromatic Polyester Polyol", Jul. 2007, pp. 1-5.
Oxid L.P., "Material Safety Data Sheet—TEROL", Oct. 13, 2010, pp. 1-4.
Oxid L.P., "Terol Polyester Polyols—Product Applications", Apr. 13, 2012, 2 pages.
English language abstract and machine-assisted English translation for JPH 07-102031 extracted from espacenet.com database on Jul. 23, 2015, 11 pages.
English language abstract not found for CN 1201472; however, see English language equivalent U.S. Pat. No. 5,684,057. Original document extracted from espacenet.com database on Apr. 5, 2017, 33 pages.

\* cited by examiner

RIGID FOAM

RELATED APPLICATIONS

This application is the National Stage of International Patent Application No. PCT/US2014/011464, filed on Jan. 14, 2014, which claims priority to and all the advantages of U.S. Patent Application No. 61/752,483, filed on Jan. 15, 2013, the content of which is incorporated herein by reference.

FIELD OF THE INVENTION

The present invention generally relates to a rigid foam and, more specifically, to a rigid foam comprising the reaction product of an isocyanate component and an isocyanate-reactive component and to a method of forming the rigid foam.

DESCRIPTION OF THE RELATED ART

There is an increasing demand for better performing rigid foams that have particular flammability specifications and acceptable physical properties. It is well known in the art that when conventional rigid foams, particularly spray foams, are formed in thicknesses of greater than about 2 inches, such foams are subject to internal scorching due to high exotherm temperatures resulting from reactions of certain isocyanates and polyols during formation. Internal scorching not only degrades the physical properties of the rigid foams, rendering them unsuitable for most applications, but also has the potential to cause other problems related to flammability. For example, these conventional rigid foams are vulnerable to burning and smoking, all of which are undesirable.

To reduce scorch, decrease flammability, and decrease smoking, many conventional rigid foams include high levels of halogenated flame retardants. In fact, the California home furnishing flammability requirement, known in the art as Technical Bulletin 117 (TB 117), has led to the annual use of millions of pounds of halogenated fire retardants in California since the early 1980's. Typical halogenated flame retardants are classified as halocarbons and tend to include organochlorines such as PCBs, organobromines such as PBDEs, and halogenated phosphorous compounds such as tri-o-cresyl phosphate, TRIS, TEPA, and others. Although halogenated flame retardants are inexpensive and are used to meet the California requirement, they have been linked to environmental concerns.

SUMMARY OF THE INVENTION AND ADVANTAGES

The present invention provides a rigid foam having increased flame retardance. The rigid foam comprises the reaction product of an isocyanate component and an isocyanate-reactive component. The isocyanate component has isocyanate functional groups and the isocyanate-reactive component has isocyanate-reactive functional groups. The isocyanate component and the isocyanate-reactive component are reacted in the presence of an isocyanurate catalyst component for forming at least one isocyanurate moiety and in the presence of a carbodiimide catalyst component for forming at least one carbodiimide moiety. The isocyanurate catalyst component comprises 1,3,5-tris(3-(dimethylamino) propyl)-hexahydro-s-triazine and the carbodiimide catalyst component comprises 3-methyl-1-phenyl-2-phospholene-1-oxide. The isocyanate component, isocyanate-reactive component, isocyanurate catalyst component, and carbodiimide catalyst component form a mixture having a rise time of no greater than about 150 seconds and a tack-free time of no greater than about 120 seconds.

The present invention also provides a method of forming the rigid foam on a surface. The method comprises the step of providing the isocyanate component having the isocyanate functional groups. The method also comprises the step of providing the isocyanate-reactive component having the isocyanate-reactive functional groups. The method further comprises the step of providing the isocyanurate catalyst component for forming the at least one isocyanurate moiety. The method yet further comprises the step of providing the carbodiimide catalyst component for forming the at least one carbodiimide moiety. The method also comprises the step of spraying the isocyanate component, isocyanate-reactive component, isocyanurate catalyst component, and carbodiimide catalyst component onto the surface to form the rigid foam on the surface.

DETAILED DESCRIPTION OF THE INVENTION

The present invention provides a rigid foam and a method of forming the rigid foam. The rigid foam is particularly suitable for spray foam applications wherein the rigid foam is formed from spraying, such as spray foam insulation, e.g. in a cushion or in support applications. However, it is to be appreciated that the rigid foam of the present invention may have applications beyond spray foam insulation. As set forth in further detail below, the rigid foam exhibits excellent thermal stability while minimizing the use of conventional flame retardant additives and has a fast curing rate while minimizing cracking and creeping of the rigid foam.

The rigid foam may be open or closed celled and typically includes a highly cross-linked, polymer structure that allows the foam to have good heat stability, high compression strength at low density, low thermal conductivity, and desirable barrier properties. Typically, the rigid foam of this invention has a glass transition temperature greater than room temperature (~23° C.+/−2° C. (~73.4+/−3.6° F.)) and is typically rigid at room temperature. As generally recognized by those of skill in the art, foams are rigid at or below their glass transition temperatures especially in glassy regions of their storage moduli. In various embodiments, the rigid foam has a density of from about 1 to about 81, about 16 to about 65, or about 16 to about 49, kilogram(s) per cubic meter (or from about 0.1 to about 5, about 1 to about 4, or about 1 to about 3, pound(s) per cubic foot (pcf)).

The rigid foam may have flame spread index values and smoke developed index values, each according to ASTM Designation E84-10, as described below. For example, in various embodiments, the rigid foam has the flame spread index value of no greater than 25, alternatively no greater than 20, no greater than 15, no greater than 10, or no greater than 5, each as measured according to ASTM Designation E84-10. Alternatively, the rigid foam has the flame spread index value of from 0 to 25, from 5 to 25, from 10 to 25, from 15 to 25, or from 20 to 25. In other embodiments, the rigid foam has the smoked developed value of no greater than 450, alternatively no greater than 400, no greater than 350, no greater than 300, or no greater than 250, each as measured according to ASTM Designation E84-10. Alternatively, the rigid foam has the smoked developed value of from 0 to 450, from 250 to 450, from 300 to 450, from 350 to 450, or from 400 to 450. In certain embodiments, the rigid foam has a flame spread index value of no greater than 25 and a smoked developed value of no greater than 450, each as measured according to ASTM Designation E84-10. In other embodiments, the rigid foam has a flame spread index value of no greater than 25 or a smoked developed value of no greater than 450, each as measured according to ASTM Designation E84-10.

The rigid foam comprises the reaction product of an isocyanate component and an isocyanate-reactive component. The isocyanate component has isocyanate functional groups (NCO groups) and the isocyanate-reactive component has isocyanate-reactive functional groups, such as hydroxyl groups (—OH) and/or amine groups (—NH). Typically, at least a portion of the isocyanate-reactive functional groups are hydroxyl groups such that the NCO groups and the isocyanate-reactive functional groups comprising hydroxyl groups react to form at least one polyurethane moiety. For purposes of clarity, the at least one polyurethane moiety is hereinafter referred to as "the polyurethane moiety" and/or "the polyurethane moieties".

In embodiments when the NCO groups and the isocyanate-reactive functional groups comprise amine groups in addition or alternatively to hydroxyl groups, the amine groups generally react with the NCO groups to form at least one polyurea moiety. For purposes of clarity, the at least one polyurea moiety is hereinafter referred to as "the polyurea moiety" and/or "the polyurea moieties". It is to be appreciated the isocyanate-reactive component may be free of hydroxyl groups, thereby only comprising the amine groups such that the NCO groups and the isocyanate-reactive functional groups react to form the polyurea moiety. Typically, the isocyanate-reactive functional groups comprise both the hydroxyl groups and amine groups such that the reaction of the isocyanate-reactive functional groups and the NCO groups forms the polyurethane moiety and the polyurea moiety.

The isocyanate and isocyanate-reactive components are reacted in the presence of an isocyanurate catalyst component for forming at least one isocyanurate moiety in the rigid foam. More specifically, at least three of the NCO groups of the isocyanate component self-react in the presence of the isocyanurate catalyst component to form the at least one isocyanurate moiety. For purposes of clarity, the at least one isocyanurate moiety is hereinafter referred to as "the isocyanurate moiety" and/or "the isocyanurate moieties". "Self-react," as used herein, is to be interpreted as a first portion of the NCO groups of the isocyanate component reacting with a second portion of the NCO groups of the isocyanate component wherein the isocyanate component comprises at least one monomer, oligomer, and/or polymer having the NCO groups such that the first portion and/or the second portion are of the same and/or different monomer, oligomer, and/or polymer. Said differently, the NCO groups of the isocyanate component may react intra-molecularly, inter-molecularly, or a combination thereof. The isocyanurate moiety is formed by trimerization of three NCO groups in the presence of the isocyanurate catalyst component. Formation of the isocyanurate moiety is shown below for illustrative purposes only wherein R is a polyvalent organic radical:

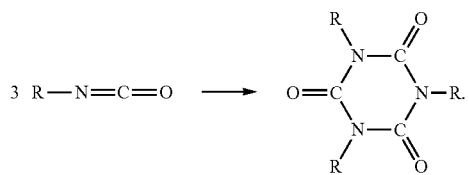

The isocyanurate catalyst component comprises 1,3,5-tris (3-(dimethylamino)propyl)-hexahydro-s-triazine. Although note required, it is believed that the 1,3,5-tris(3-(dimethylamino)propyl)-hexahydro-s-triazine increases flame retardance of the rigid foam by forming the isocyanurate moiety. The 1,3,5-tris(3-(dimethylamino)propyl)-hexahydro-s-triazine has the following chemical structure:

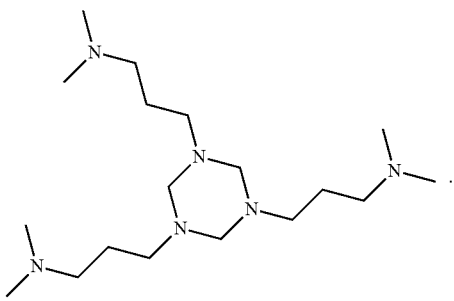

The isocyanurate moiety provides a thermally stable linkage in the rigid foam. The thermally stable linkage hinders generation of combustible gases during exposure of the rigid foam to a flame, thereby reducing combustibility of the rigid foam when the polyurethane moiety is present. As such, flame retardance of the rigid foam is increased by inclusion of the isocyanurate moiety. Typically, the isocyanurate moiety in the rigid foam has a higher thermal stability than the polyurethane moiety in the rigid foam. However, the isocyanurate moiety in the rigid foam increases brittleness of the rigid foam due to an increased crosslink density resulting from formation of the isocyanurate moiety. The isocyanurate catalyst component is typically utilized in an amount of from about 0.1 to about 20, about 0.1 to about 10, or about 0.1 to about 5, parts by weight, each based on 100 parts by weight of the isocyanate component to form the isocyanurate moiety in the rigid foam. A non-limiting example of a suitable isocyanurate catalyst component is commercially available from Air Products and Chemicals, Inc. of Allentown, Pa. under the trade name of POLYCAT® 41 Catalyst.

In certain embodiments, the isocyanurate catalyst component may comprise one or more isocyanurate catalysts in addition to the 1,3,5-tris(3-(dimethylamino)propyl)-hexahydro-s-triazine to form the isocyanurate moiety in the rigid foam. It is believed that the isocyanate component and water also react in the presence of the isocyanurate catalyst component to form carbon dioxide ($CO_2$). The formation of $CO_2$ in the presence of the 1,3,5-tris(3-(dimethylamino)propyl)-hexahydro-s-triazine is typically greater than the formation of $CO_2$ in the presence of the other isocyanurate catalysts. Non-limiting examples of suitable isocyanurate catalysts are commercially available from Air Products and Chemicals, Inc. of Allentown, Pa. under the trade names of Curithane® such as 52 Catalyst, Dabco® such as K-15 Catalyst, TMR Catalyst, TMR-2 Catalyst, TMR-3 Catalyst, TMR-4 Catalyst, and TMR-5 Catalyst, and POLYCAT® such as 46 Catalyst. In other embodiments, the isocyanurate catalyst component consists essentially of or consists of 1,3,5-tris (3-(dimethylamino)propyl)-hexahydro-s-triazine.

The isocyanate and isocyanate-reactive components are also reacted in the presence of a carbodiimide catalyst component for forming at least one carbodiimide moiety in the rigid foam. More specifically, at least two of the NCO groups of the isocyanate component self-react in the presence of the carbodiimide catalyst component to form the at least one carbodiimide moiety. For purposes of clarity, the at least one carbodiimide moiety is hereinafter referred to as "the carbodiimide moiety" and/or "the carbodiimide moieties". The carbodiimide moiety is formed by a condensation reaction of two NCO groups in the presence of the carbodiimide catalyst component. In addition, $CO_2$ is typically formed as a byproduct of this condensation reaction. In certain embodiments, $CO_2$ may be used as a blowing agent during formation of the rigid foam. However, formation of $CO_2$ may result in cracking of the rigid foam. Formation of the carbodiimide moiety is shown below for illustrative purposes only wherein R is a polyvalent organic radical:

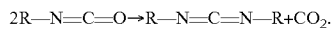

The carbodiimide catalyst component comprises 3-methyl-1-phenyl-2-pholene-1-oxide. Although not required, it is believed that the 3-methyl-1-phenyl-2-phospholene-1-oxide increases flame retardance of the rigid foam by forming the carbodiimide moiety. This 3-methyl-1-phenyl-2-phospholene-1-oxide may be utilized alone or in combination with other carbodiimide catalysts. The 3-methyl-1-phenyl-2-phospholene-1-oxide has the following chemical structure:

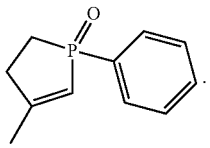

The carbodiimide moiety provides a thermally stable linkage in the rigid foam. As described above, the thermally stable linkage hinders generation of combustible gases during exposure of the rigid foam to a flame. As such, flame retardance of the rigid foam is increased by inclusion of the carbodiimide moiety in the rigid foam. As with the isocyanurate moiety, the carbodiimide moiety in the rigid foam typically has a higher thermal stability than the polyurethane moiety in the rigid foam when the polyurethane moiety is present. However, the carbodiimide moiety has greater flexibility than the isocyanurate moiety in the rigid foam due to the lower degree of polymerization of the carbodiimide moiety than the isocyanurate moiety. The carbodiimide catalyst component is typically utilized in an amount of from about 0.1 to about 20, alternatively from about 0.1 to about 10, alternatively from about 0.1 to about 5, parts by weight, each based on 100 parts by weight of the isocyanate component to form the carbodiimide moiety in the rigid foam.

In certain embodiments, the carbodiimide catalyst component further comprises a solvent. In these certain embodiments, the solvent may comprise triethyl phosphate. Triethyl phosphate has the following chemical structure:

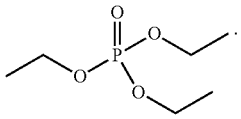

It is believed that the triethyl phosphate, in combination with the 3-methyl-1-phenyl-2-phospholene-1-oxide, helps catalyze a chemical reaction between at least two of the NCO groups of the isocyanate component to form the carbodiimide moiety In addition, the triethyl phosphate has a synergistic effect on the flame retardance of the rigid foam when in combination with the 3-methyl-1-phenyl-2-phospholene-1-oxide.

Typically, the 3-methyl-1-phenyl-2-phospholene-1-oxide is utilized in an amount of from about 10 to about 45, alternatively from about 15 to about 40, alternatively from about 19 to about 23, alternatively from about 32 to about 36, parts by weight, each based on 100 parts by weight of the carbodiimide catalyst component. Typically, the triethyl phosphate is utilized in an amount of from about 55 to about 90, alternatively from about 60 to about 85, alternatively from about 64 to about 68, alternatively from about 77 to about 81, parts by weight, each based on 100 parts by weight of the carbodiimide catalyst component.

In one embodiment, the isocyanate and isocyanate-reactive components are reacted in the presence of the isocyanurate catalyst component for forming the at least one isocyanurate moiety and the isocyanate and isocyanate-reactive components are reacted in the presence of the carbodiimide catalyst component for forming the at least one carbodiimide moiety. In another embodiment, the isocyanate and isocyanate-reactive components are reacted in the presence of the isocyanurate catalyst component for forming the at least one isocyanurate moiety or the isocyanate and isocyanate-reactive components are reacted in the presence of the carbodiimide catalyst component for forming the at least one carbodiimide moiety.

Typically, the isocyanate component and the isocyanate-reactive component are reacted at an isocyanate index of from about 100 to about 500, alternatively from about 200 to about 400, alternatively from about 250 to about 350, to form the rigid foam. However, it is to be appreciated that the isocyanate component and the isocyanate-reactive component may be greatly over indexed, i.e., a stoichiometric excess of the isocyanate component to the isocyanate-reactive component may be provided, which may maximize dimensional stability of the rigid foam. In addition, formation of the carbodiimide moiety, the isocyanurate moiety, and the polyurethane moiety in the rigid foam is non-competitive in this embodiment due to the stoichiometric excess of the isocyanate component to the isocyanate-reactive component. Said differently, the isocyanate-reactive component reacts with a first portion of the isocyanate component to form the polyurethane moiety in the rigid foam and a second portion of the isocyanate component reacts with itself to form the carbodiimide moiety and/or the isocyanurate moiety in the rigid foam.

The isocyanate component, isocyanate-reactive component, isocyanurate catalyst component, and carbodiimide catalyst component are combined to form a mixture. Although not required, it is believed that the isocyanate component, isocyanate-reactive component, isocyanurate catalyst component, and carbodiimide catalyst component form the mixture prior to curing to form the rigid foam. The mixture has a rise time of no greater than about 150 seconds, no greater than about 120 seconds, no greater than about 60 seconds, no greater than about 45 seconds, no greater than about 30 seconds, no greater than about 20 seconds, no greater than about 10 seconds, no greater than about 5 seconds, or no greater than about 3 seconds. Alternatively, the mixture has a rise time of from about 0.01 to about 150 seconds, about 0.1 to about 150, about 0.1 to about 50, about 0.1 to about 25, about 0.1 to about 10, or about 0.1 to about 5 seconds. The mixture has a tack-free time of no greater than about 120 seconds, no greater than about 60 seconds, no greater than about 45 seconds, no greater than about 30 seconds, no greater than about 20 seconds, no greater than about 10 seconds, or no greater than about 5 seconds. Alternatively, the mixture has a tack-free time of from about 0.01 to about 120, about 0.1 to about 120, about 0.1 to about 50, about 0.1 to about 25, about 0.1 to about 10, or about 0.1 to about 5 seconds. In certain embodiments, the mixture has a rise time of about 0.5 seconds and a tack-free time of about 3 seconds. In other embodiments, the mixture has a rise time of about 0.5 seconds or a tack-free time of about 3 seconds. In one embodiment, the mixture has a rise time of no greater than 150 seconds and a tack-free time of no greater than about 120 seconds. In another embodiment, the mixture has a rise time of no greater than 150 seconds or a tack-free time of no greater than about 120 seconds. Typically, the rise time and the tack-free time are general indicators of cure rate of the rigid foam.

Referring back to the isocyanate component of the rigid foam first introduced above, the isocyanate component comprises at least one isocyanate and may include more than one isocyanate. It is to be appreciated that the terminology "isocyanate" as used herein, is not limited to monomeric isocyanate, i.e., the isocyanate component may comprise monomeric isocyanate and/or polymeric isocyanate. In addition, the terminology "isocyanate" as used herein, encompasses prepolymers. Said differently, the prepolymers, e.g. polyols reacted with excess isocyanate, wherein the prepolymers still have NCO groups, may be utilized in or as the isocyanate component in the present invention.

The isocyanate component typically comprises an aromatic isocyanate, an aliphatic isocyanate, and/or combinations thereof. In certain embodiments, the isocyanate component comprises an aromatic isocyanate, such as MDI, which may correspond to any isomer of MDI. When the isocyanate component comprises an aromatic isocyanate, the aromatic isocyanate typically corresponds to the formula R'(NCO)$_z$ wherein R' is a polyvalent organic radical which is aromatic and z is an integer that corresponds to the valence of R'. Typically, z is at least 2.

The isocyanate component may comprise, but is not limited to, 1,4-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitro-benzene, 2,5-diisocyanato-1-nitrobenzene, m-phenylene diisocyanate, p-phenylene diisocyanate, 2,4-toluene diisocyanate, 2,6-toluene diisocyanate, mixtures of 2,4- and 2,6-toluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethyl-4,4'-diphenylmethane diisocyanate, and 3,3'-dimethyldiphenylmethane-4,4'-diisocyanate, triisocyanates such as 4,4',4''-triphenylmethane triisocyanate polymethylene polyphenylene polyisocyanate and 2,4,6-toluene triisocyanate, tetraisocyanates such as 4,4'-dimethyl-2,2'-5,5'-diphenylmethane tetraisocyanate, toluene diisocyanate, 2,2'-diphenylmethane diisocyanate, 2,4'-diphenylmethane diisocyanate, 4,4'-diphenylmethane diisocyanate, polymethylene polyphenylene polyisocyanate, corresponding isomeric mixtures thereof, and combinations thereof.

When the isocyanate component comprises an aromatic isocyanate, the isocyanate component may further comprise a modified multivalent aromatic isocyanate, i.e., a product which is obtained through chemical reactions of aromatic diisocyanates and/or aromatic polyisocyanates. Suitable polyisocyanates include, but are not limited to, ureas, biurets, allophanates, carbodiimides, uretonimines, and isocyanurate and/or urethane groups including diisocyanates and/or polyisocyanates such as modified diphenylmethane diisocyanates. It is to be appreciated that the isocyanate component comprising the carbodiimide and/or the isocyanurate is not the same as the NCO groups of the isocyanate component self-reacting to form the carbodiimide moiety and/or the isocyanurate moiety in the rigid foam. Said differently, in-situ formation of the carbodiimide moiety and/or the isocyanurate moiety in the rigid foam provides increased flame retardance while formation of the carbodiimide moieties and/or the isocyanurate moieties separate from formation of the rigid foam may not provide increased flame retardance. The urethane groups of the isocyanate may be formed through reaction of a base isocyanate, as described above, with low molecular weight diols, triols, dialkylene glycols, trialkylene glycols, polyoxyalkylene glycols with a number average molecular weight of up to 1500 g/mol, diethylene glycol, dipropylene glycol, polyoxyethylene glycol, polyoxypropylene glycol, polyoxyethylene glycol, polyoxypropylene glycol, and/or polyoxypropylene polyoxyethylene glycols or -triols, and/or combinations thereof.

The isocyanate component may also comprise, but is not limited to, modified benzene and toluene diisocyanates, employed individually or in reaction products with polyoxyalkyleneglycols, diethylene glycols, dipropylene glycols, polyoxyethylene glycols, polyoxypropylene glycols, polyoxypropylenepolyoxethylene glycols, polyesterols, polycaprolactones, and combinations thereof. The isocyanate component may also include stoichiometric or non-stoichiometric reaction products of the aforementioned isocyanates.

Alternatively, the isocyanate component may comprise a liquid polyisocyanate including one or more carbodiimide groups. However, it is to be appreciated that an isocyanate component comprising carbodiimide groups which are formed separate from the formation of the rigid foam may not provide increased flame retardance in the rigid foam as does formation of the carbodiimide moiety in the rigid foam. Said differently, in-situ formation of the carbodiimide moiety in the rigid foam provides increased flame retardance while additive additions of an isocyanate component comprising carbodiimide groups may not provide increased flame retardance. In various embodiments, crude polyisocyanates may also be used, such as crude toluene diisocyanate obtained by the phosgenation of a mixture of toluenediamines or crude diphenylmethane isocyanate obtained by the phosgenation of crude isocyanates.

In other embodiments, the isocyanate component of the rigid foam comprises at least one of polymethylene polyphenyl polyisocyanate (PMDI), 4,4'-diphenylmethane diisocyanate (4,4'-MDI), and 2,4'-diphenylmethane diisocyanate (2,4'-MDI). Non-limiting examples of suitable isocyanate components are commercially available from BASF Corporation of Florham Park, N.J. under the trade names of Lupranate® M10, M20, and M70R.

Typically, the isocyanate component comprises PMDI, 4,4'-MDI, and 2,4'-MDI. In general, 4,4'-MDI and 2,4'-MDI are more reactive than PMDI. It is believed that because 4,4'-MDI and 2,4'-MDI are more reactive, formation of the carbodiimide moiety from 4,4'-MDI and 2,4'-MDI is accelerated in the rigid foam. Since $CO_2$ is typically formed during formation of the carbodiimide moiety, accelerated formation of $CO_2$ may cause the rigid foam to crack. Therefore, it is believed that an isocyanate component having increased PMDI relative to 4,4'-MDI and 2,4'-MDI may form a rigid foam exhibiting less cracking.

In these various embodiments, the isocyanate component comprises from about 25 to about 75 parts by weight of PMDI based on 100 parts by weight of the isocyanate component. In one embodiment, the isocyanate component comprises from about 25 to about 35 parts by weight of PMDI based on 100 parts by weight of the isocyanate component. In another embodiment, the isocyanate component comprises from about 55 to about 65 parts by weight of PMDI based on 100 parts by weight of the isocyanate component. In yet another embodiment, the isocyanate component comprises from about 65 to about 75 parts by weight of PMDI based on 100 parts by weight of the isocyanate component.

In these various embodiments, the isocyanate component further comprises from about 25 to about 65 parts by weight of 4,4'-MDI based on 100 parts by weight of the isocyanate component. In one embodiment, the isocyanate component further comprises from about 25 to about 35 parts by weight of 4,4'-MDI based on 100 parts by weight of the isocyanate component. In another embodiment, the isocyanate component further comprises from about 35 to about 45 parts by weight of 4,4'-MDI based on 100 parts by weight of the isocyanate component. In yet another embodiment, the isocyanate component further comprises from about 55 to about 65 parts by weight of 4,4'-MDI based on 100 parts by weight of the isocyanate component.

In these various embodiments, the isocyanate component further comprises from 0 to about 30 parts by weight of 2,4'-MDI based on 100 parts by weight of the isocyanate component. Alternatively, the isocyanate component further comprises from about 0.1 to about 10, or about 1 to about 5, part(s) by weight of 2,4'-MDI, each based on 100 parts by weight of the isocyanate component.

Typically, the isocyanate component has an NCO content of from about 5 to about 50, about 15 to about 45, about 25 to about 40, or about 30 to about 35, parts by weight, each based on 100 parts by weight of the isocyanate component. Determination of the NCO content on percent by weight is accomplished by a conventional chemical titration analysis known to those skilled in the art.

The isocyanate component typically has a dynamic viscosity of from about 0.001 to about 2.5, about 0.01 to about 1, about 0.02 to about 0.5, or about 0.03 to about 0.1, pascal seconds (Pa*s) at 25° C. (or from about 1 to about 2500, about 10 to about 1000, about 20 to about 500, or about 30 to about 100, centipoise (cps) at 25° C.). Alternatively, the isocyanate component typically has a dynamic viscosity of from about 0.01 to about 1, about 0.1 to about 0.5, or about 0.15 to about 0.25, Pa*s at 25° C. (or from about 10 to about 1000, about 100 to about 500, or about 150 to about 250, cps at 25° C.). Alternatively, the isocyanate component typically has a dynamic viscosity of from about 0.01 to about 1, about 0.1 to about 0.5, about 0.5 to about 0.8, or about 0.65 to about 0.75, Pa*s at 25° C. (or from about 10 to about 1000, about 500 to about 800, or about 650 to about 750, cps at 25° C.). In certain embodiments, the isocyanate component has a temperature of from about 48 to about 83° C. (or from about 120 to about 180° F. when forming the rigid foam as described in greater detail below with regards to the method. As such, an isocyanate component having a dynamic viscosity of about 0.7 Pa*s at 25° C. (or about 700 cps at 25° C.) may be preferred for isocyanate components having the temperature of from about 7 to about 30° C. (or from about 45 to about 85° F.).

In certain embodiments, the isocyanate-reactive component comprises a polyester polyol. Typically, the polyester polyol has a nominal functionality of from about 1 to about 8, about 1 to about 6, about 2 to about 4, or about 2 to about 3. The polyester polyol typically has a hydroxyl number of from about 10 to about 1,000, \ about 100 to about 500, about 150 to about 450, or about 200 to about 400, mg KOH/g. The polyester polyol also typically has a dynamic viscosity of from about 20 to about 50,000, about 2,000 to about 20,000, about 4,000 to about 10,000, or about 5,000 to about 6,000, cps at 25° C. If utilized, the polyester polyol is typically utilized in an amount of from about 35 to about 75, about 40 to about 70, or about 45 to about 65, parts by weight, each based on 100 parts by weight of the isocyanate-reactive component. Suitable examples of the polyester polyol include, but are not limited to aromatic polyester polyols commercially available from Oxid, L.P. of Houston, Tex. under the trade names of Terol® 11, 250, 256, 258, 305, 350, 352, 353, 375, 563, 925, and/or 1154.

In other embodiments, the isocyanate-reactive component comprises a Mannich polyol. The Mannich polyol has autocatalytic activity for increasing formation of the polyurethane moiety from reaction of the NCO groups and the hydroxyl groups. Typically, the Mannich polyol has a total amine value of from about 10 to about 1,000, about 50 to about 500, about 100 to about 400, or about 100 to about 300, mg KOH/g. The Mannich polyol typically has a hydroxyl number of from about 10 to about 1,000, about 200 to about 800, about 300 to about 700, or about 400 to about 600, mg KOH/g. The Mannich polyol also typically has a dynamic viscosity of from about 20 to about 50,000 about 2,000 to about 20,000, about 6,000 to about 15,000, or about 9,000 to about 11,000, cps at 25° C. If utilized, the Mannich polyol is typically utilized in an amount of from about 1 to about 30, about 5 to about 25, or about 10 to about 30, parts by weight, each based on 100 parts by weight of the isocyanate-reactive component. A suitable example of the Mannich polyol is commercially available from Carpenter Co. Chemicals Division of Richmond, Va. under the trade name of CARPOL® MX-470.

In various embodiments, the rigid foam may also comprise a conventional flame retardant additive. The conventional flame retardant additive may be included in the isocyanate-reactive component to provide increased flame retardance of the rigid foam in various applications. Alternatively, the isocyanate component may comprise the conventional flame retardant additive or the conventional flame retardant additive may be utilized in the rigid foam separate from the isocyanate-reactive component and/or isocyanate component. In commercial applications, those skilled in the art may select whether to include the conventional flame retardant additive in the isocyanate-reactive component. It is also to be understood that the isocyanate-reactive component may include a plurality of conventional flame retardant additives. If utilized, the conventional flame retardant additive may be utilized in any amount.

In various embodiments, the conventional flame retardant additive is selected from the group of phosphorous, halogens, and combinations thereof. Examples of the conventional flame retardant additive include, but are not limited to, red phosphorus, ammonium polyphosphate, tris(2-chloroethyl)phosphate, tris(2-chloropropyl)phosphate, tetrakis(2-chloroethyl)ethylene diphosphate, dimethyl methane phosphonate, dimethylpropanephosphonate, diethyl diethanolaminomethylphosphonate, and combinations thereof. In another embodiment, the conventional flame retardant additive is selected from the group of tricresyl phosphate, tris(2-chloroethyl)phosphate, tris(2-chloropropyl)phosphate, tris(2,3-dibromopropyl)phosphate, red phosphorous, aluminum oxide hydrate, antimony trioxide, arsenic oxide, ammonium polyphosphate and calcium sulfate, molybdenum trioxide, ammonium molybdate, ammonium phosphate, pentabromodiphenyloxide, 2,3-dibromopropanol, hexabromocyclododecane, dibromoethyldibromocyclohexane, expandable graphite or cyanuric acid derivatives, melamine, and corn starch. Additionally, other supplemental conventional flame retardant additives are also contemplated for use in the present invention including, but not limited to, hydrated aluminum oxide, calcium sulfate, expanded graphite, cyanuric acid derivatives, and combinations thereof. It is to be appreciated that although 1-methyl-1-phenyl-2-phospholene-1-oxide and triethyl phosphate comprise phosphous, 1-methyl-1-phenyl-2-phospholene-1-oxide and triethyl phosphate are not conventional flame retardant additives as defined in the present invention.

In certain embodiments, the rigid foam is substantially free of conventional flame retardant additives, yet exhibits flame retardance. The terminology "substantially free" typically refers to the rigid foam comprising less than about 1, less than about 0.5, or less than about 0.1, parts by weight of the conventional flame retardant additives, each based on 100 parts by weight of the rigid foam.

The isocyanate-reactive component may also comprise a polymerization catalyst component. Alternatively, the isocyanate component may comprise the polymerization catalyst or the polymerization catalyst may be utilized in the rigid foam separate from the isocyanate-reactive component and/or isocyanate component. The polymerization catalyst component typically catalyzes the reaction of the isocyanate component and the isocyanate-reactive component. In embodiments where the isocyanate-reactive group has the hydroxyl groups, the NCO group of the isocyanate component and the isocyanate-reactive groups of the isocyanate-reactive component react in the presence of the polymerization catalyst component to form the polyurethane moiety. In embodiments where the isocyanate-reactive group has the amine groups, the NCO group of the isocyanate component and the isocyanate-reactive groups of the isocyanate-reactive component react in the presence of the polymerization catalyst component to form the polyurea moiety. The polymerization catalyst component may include one or more catalysts. The polymerization catalyst component is typically present to catalyze the exothermic reaction between the isocyanate-reactive component and the isocyanate component. It is to be appreciated that the polymerization catalyst component is typically not consumed in, the exothermic reaction. That is, the polymerization catalyst component typically participates in, but is not consumed in, the exothermic reaction. The polymerization catalyst component may include any suitable catalyst or mixtures of catalysts known in the art. Examples of suitable catalysts include amine catalysts, metal catalysts, and a combination thereof. If utilized, the catalyst may be included in various amounts. Examples of suitable amine catalysts include amidines such as 2,3-dimethyl-3,4,5,6-tetrahydropyrimidine, tertiary amines such as triethylamine, tributylamine, dimethylbenzylamine, N-methylmorpholine, S-ethylmorpholine, N-cyclohexylmorpholine, N,N,N',N'-tetramethylethylenediamine, N,N,N',N'-tetramethylbutanediamine, N,N,N',N'-tetramethylhexane-1,6-diamine, pentamethyldiethylenetriamine, bis(dimethylaminoethyl) ether, bis(dimethylaminopropyl)urea dimethylpiperazine, 1,2-dimethylimidazole, 1-azabicyclo[3.3.0]octane and typically 1,4-diazabicyclo[2.2.2]octane, and alkanolamine compounds such as triethanolamine, triisopropanolamine, N-methyldiethanolamine and N-ethyldiethanolamine, dimethylethanolamine, and combinations thereof. Examples of suitable metal catalysts include tin, iron, lead, bismuth, mercury, titanium, hafnium, zirconium, iron(II) chloride, zinc chloride, lead octoate stabilized stannous octoate, tin(II) salts of organic carboxylic acids such as tin(II) acetate, tin(II) octoate, tin(II) ethylhexanoate and tin(II) laurate, and dialkyltin(IV) salts of organic carboxylic acids such as dibutyltin dilaurate, dibutyltin diacetate, dibutyltin maleate and dioctyltin diacetate, and combinations thereof. In certain embodiments, the polymerization catalyst component comprises dimethylethanolamine. If utilized, the polymerization catalyst component is utilized in an amount of from about 0.01 to about 10, about 0.1 to about 5, about 0.1 to about 3, or about 1 to about 2, parts by weight, each based on 100 parts by weight of the isocyanate-reactive component.

In certain embodiments, the isocyanate-reactive component comprises one or more blowing agents including, but not limited to, physical blowing agents, chemical blowing agents, or combinations thereof. Alternatively, the isocyanate component may comprise the blowing agent or the blowing agent may be utilized in the rigid foam separate from the isocyanate-reactive component and/or isocyanate component. The blowing agent may include both a physical blowing agent and a chemical blowing agent, and the blowing agent may be included in the isocyanate-reactive component. Typically, the physical blowing agent does not chemically react with the isocyanate-reactive component and/or the isocyanate component to provide a blowing gas whereas the chemical blowing agent reacts with the isocyanate component and/or the isocyanate-reactive component to provide the blowing gas. The physical blowing agent may be a gas or liquid. The physical blowing agent that is liquid typically evaporates into a gas when heated, and typically returns to a liquid when cooled. The blowing agent may include, but is not limited methylene chloride, formic acid, acetone, and liquid carbon dioxide, aliphatic and/or cycloaliphatic hydrocarbons such as halogenated hydrocarbons and alkanes, acetals, water, alcohols, glycerol, formic acid, and combinations thereof.

In various embodiments, the blowing agent is selected from the group of volatile non-halogenated $C_2$-$C_7$ hydrocarbons such as alkanes, alkenes, cycloalkanes having up to 6 carbon atoms, dialkyl ether, cycloalkylene ethers and ketones, and hydrofluorocarbons, C1-C4 hydrofluorocarbons, volatile non-halogenated hydrocarbon such as linear or branched alkanes such as butane, isobutane, 2,3-dimethylbutane, n- and isopentanes, n- and isohexanes, n- and isoheptanes, n- and isooctanes, n- and isononanes, n- and isodecanes, n- and isoundecanes, and n- and isodedecanes, alkenes such as 1-pentene, 2-methylbutene, 3-methylbutene, and 1-hexene, cycloalkanes such as cyclobutane, cyclopentane, and cyclohexane, linear and/or cyclic ethers such as dimethyl ether, diethyl ether, methyl ethyl ether, vinyl methyl ether, vinyl ethyl ether, divinyl ether, tetrahydrofuran and furan, ketones such as acetone, methyl ethyl ketone and cyclopentanone, isomers thereof, hydrofluorocarbons such as difluoromethane (HFC-32), 1,1,1,2-tetrafluoroethane (HFC-134a), 1,1,2,2-tetrafluoroethane (HFC-134), 1,1-difluoroethane (HFC-152a), 1,2-difluoroethane (HFC-142), trifluoromethane, heptafluoropropane (R-227a), hexafluoropropane (R-136), 1,1,1-trifluoroethane, 1,1,2-trifluoroethane, fluoroethane (R-161), 1,1,1,2,2-pentafluoropropane, pentafluoropropylene (R-2125a), 1,1,1,3-tetrafluoropropane, tetrafluoropropylene (R-2134a), difluoropropylene (R-2152b), 1,1,2,3,3-pentafluoropropane, 1,1,1,3,3-pentafluoro-n-butane, and 1,1,1,3,3-pentafluoropentane (HFC-245fa), isomers thereof, 1,1,1,2-tetrafluoroethane (HFC-134a), isomers thereof, and combinations thereof. In various embodiments, the blowing agent comprises 1,1,1,3,3-pentafluoropentane (245fa), water, or a combination thereof.

When utilized as or in the blowing agent, 1,1,1,3,3-pentafluoropentane (HFC-245fa) is utilized in an amount of from about 1 to about 20, about 1 to about 15, about 5 to about 15, about 5 to about 10, or about 8 to about 10, parts by weight, each based on 100 parts by weight of the isocyanate-reactive component.

When utilized as or in the blowing agent, water is utilized in an amount of from about 0.1 to about 5, about 0.1 to about 4, or about 0.1 to about 3, parts by weight, each based on 100 parts by weight of the isocyanate-reactive component. It is also contemplated that both a non-water blowing agent and water may be present simultaneously in one or more of the above amounts. Typically, the amount of the blowing agent and/or water is selected based on a desired density of the rigid foam and solubility of the blowing agent in the isocyanate-reactive component. It is desirable to minimize amounts of the blowing agent used to reduce costs.

In other embodiments, the isocyanate-reactive component may also comprise one or more blowing catalysts. Alternatively, the isocyanate component may comprise the blowing catalyst or the blowing catalyst may be utilized in the rigid foam separate from the isocyanate-reactive component and/or isocyanate component. Particularly suitable non-limiting examples of blowing catalysts are commercially available from Air Products of Allentown, Pa. under trade names DABCO® and Polycat® such as DABCO® BL-17, DABCO® BL-19, DABCO® BL-11, DABCO® BL-22, DABCO® BLX-11, DABCO® BLX-13, DABCO® NE 210, DABCO® NE 600, DABCO® T, Polycat® 36, Polycat® 5, Polycat® 77, and combinations thereof. If utilized, the blowing catalyst may be utilized in an amount of from about 0.01 to about 10, about 0.1 to about 5, or about 1 to about 3, parts by weight, each based on 100 parts by weight of the isocyanate-reactive component.

The isocyanate-reactive component may also comprise a silicone, such as a silicone surfactant. Alternatively, the isocyanate component may comprise the silicone or the silicone may be utilized in the rigid foam separate from the isocyanate-reactive component and/or isocyanate component. Typically, silicone surfactants control cell size and shape of the rigid foam comprising the reaction product of the isocyanate-reactive component and isocyanate component. In certain embodiments, the silicone surfactant is commercially available from Air Products under the trade name of DABCO® DC 193. If utilized, the silicone surfactant may be utilized in an amount of from about 0.1 to about 10, about 0.5 to about 9, about 1 to about 8, or about 2 to about 7, parts by weight, each based on 100 parts by weight of the isocyanate-reactive component.

The isocyanate-reactive component typically comprises a plasticizer. Alternatively, the isocyanate component may comprise the plasticizer or the plasticizer may be utilized in the rigid foam separate from the isocyanate-reactive component and/or isocyanate component. It is believed that the plasticizer prevents cracking of the rigid foam by softening the rigid foam thereby permitting $CO_2$ to escape from the rigid foam. In various embodiments, the plasticizer comprises (or is) tris(chloropropyl)phosphate. If utilized, the plasticizer may be utilized in an amount of from about 1 to about 50, about 1 to about 25, about 1 to about 15, about 1 to about 10, or about 3 to about 7, parts by weight, each based on 100 parts by weight of the isocyanate-reactive component.

The isocyanate-reactive component typically comprises a chain extender. Alternatively, the isocyanate component may comprise the chain extender or the chain extender may be utilized in the rigid foam separate from the isocyanate-reactive component and/or isocyanate component. It is believed that the chain extender may prevent creeping of the rigid foam. Chain extenders contemplated for use in the present invention include, but are not limited to, hydrazine, primary and secondary diamines, alcohols, amino acids, hydroxy acids, glycols, and combinations thereof. Specific chain extenders that are contemplated for use include, but are not limited to, mono and di-ethylene glycols, mono and di-propylene glycols, 1,4-butane diol, 1,3-butane diol, propylene glycol, dipropylene glycol, diethylene glycol, methyl propylene diol, mono, di and tri-ethanolamines, N—N'-bis-(2 hydroxy-propylaniline), trimethylolpropane, glycerine, hydroquinone bis(2-hydroxyethyl) ether, 4,4'-methylene-bis(2-chloroaniline), diethyltoluenediamine, 3,5-dimethylthio-toluenediamine, hydrazine, isophorone diamine, adipic acid, silanes, and combinations thereof. In various embodiments, the chain extender comprises (or is) dipropylene glycol. If utilized, the chain extender may be utilized in an amount of from about 0.1 to about 20, about 1 to about 15, about 1 to about 13, or about 2 to about 12, parts by weight, each based on 100 parts by weight of the isocyanate-reactive component.

The isocyanate-reactive component may also comprise one or more additives. Alternatively, the isocyanate component may comprise the additives or the additives may be utilized in the rigid foam separate from the isocyanate-reactive component and/or isocyanate component. Suitable additives include, but are not limited to, chain terminators, inert diluents, amines, anti-foaming agents, air releasing agents, wetting agents, surface modifiers, waxes, inert inorganic fillers, molecular sieves, reactive inorganic fillers, chopped glass, other types of glass such as glass mat, processing additives, surface-active agents, adhesion promoters, anti-oxidants, dyes, pigments, ultraviolet light stabilizers, thixotropic agents, anti-aging agents, lubricants, adhesion promoters, coupling agents, solvents, rheology promoters, and combinations thereof. The additives may be utilized in the isocyanate-reactive component and/or the isocyanate component in any amount.

The present invention further provides a method of forming the rigid foam on a surface. In certain embodiments, the surface includes oriented stand board (OSB). The rigid foam has increased flame retardance and comprises the reaction product of the isocyanate component and the isocyanate-reactive component. The isocyanate component and the isocyanate-reactive component are reacted in the presence of the isocyanurate catalyst component and the carbodiimide catalyst component.

The method comprises the step of providing the isocyanate component having the NCO groups. The method also comprises the step of providing the isocyanate-reactive component having the isocyanate-reactive functional groups. In various embodiments, the steps of providing the isocyanate component and providing the isocyanate-reactive component are facilitated by a Graco® Reactor H-VR Variable Ratio Hydraulic Proportioner. Said differently, the isocyanate component and the isocyanate-reactive component may be provided by the Graco® Reactor H-VR Variable Ratio Hydraulic Proportioner.

In other embodiments, the steps of providing the isocyanate component and providing the isocyanate-reactive component are further defined as providing the isocyanate component at 2 parts by volume based on volume of the isocyanate-reactive component and providing the isocyanate-reactive component at 1 part by volume based on volume of the isocyanate-reactive component.

In various embodiments, the steps of providing the isocyanate component and providing the isocyanate-reactive component are further defined as providing the isocyanate component and/or providing the isocyanate-reactive component having an application temperature of from about 37 to about 94, about 43 to about 88, or about 49 to about 83, ° C. (or from about 100 to about 200, about 110 to about 190, or about 120 to about 180, ° F.). It is to be appreciated that the isocyanate component and the isocyanate-reactive component may have the same or different application temperatures.

The method further comprises the step of providing the isocyanurate catalyst component for forming the isocyanurate moiety. The method yet further comprises the step of providing the carbodiimide catalyst component for forming the carbodiimide moiety. Typically, the isocyanate-reactive component comprises the isocyanurate catalyst component and the carbodiimide catalyst component. Alternatively, the steps of providing the isocyanate component, isocyanate-reactive component, isocyanurate catalyst component, and/or carbodiimide catalyst component described above may comprise purchasing or otherwise obtaining the isocyanate component, isocyanate-reactive component, isocyanurate catalyst component, and/or carbodiimide catalyst component.

The method also comprises the step of spraying the isocyanate component, isocyanate-reactive component, isocyanurate catalyst component, and carbodiimide catalyst component onto the surface to form the rigid foam on the surface. In various embodiments, the step of spraying the isocyanate component, isocyanate-reactive component, isocyanurate catalyst component, and carbodiimide catalyst component is facilitated by a Graco® Gx7 spray gun having a #3 module and a #90 pattern control disc (PCD). Said differently, the isocyanate component, isocyanate-reactive component, isocyanurate catalyst component, and carbodiimide catalyst component may be sprayed using the Graco® Gx7. Alternatively, the method may comprise the steps of spraying the isocyanate component, isocyanate-reactive component, isocyanurate catalyst component, and carbodiimide catalyst component, each individually or in any combination thereof, to form the mixture.

If utilized, the #3 module of the Graco® Gx7 spray gun typically has an isocyanate side and an isocyanate-reactive side. The isocyanate side of the #3 module may be drilled out to 0.041 inches from 0.0225 inches and the isocyanate-reactive side has a diameter of 0.018 inches to allow equal pressures on the isocyanate side and the isocyanate-reactive side.

In certain embodiments, the step of spraying the isocyanate component, isocyanate-reactive component, isocyanurate catalyst component, and carbodiimide catalyst component is further defined as spraying at a pressure of from 0 to about 13800, about 1700 to about 12100, about 3400 to about 10400, or about 5100 to about 8700, kPa (or from 0 to about 2000, about 250 to about 1750, about 500 to about 1500, or about 750 to about 1250, psi). In various embodiments, the pressure is about 1000 psi.

In other embodiments, the method further comprises the step of combining the isocyanate component, isocyanate-reactive component, isocyanurate catalyst component, and carbodiimide catalyst component to form a mixture. The mixture may be formed prior to, during, and/or after the step of spraying. Typically, the mixture is applied to the surface as a "mist pass", allowed to cure for 5 minutes, and then applied to the surface as a complete application. The "mist pass" promotes adhesion of the rigid foam to the surface.

In various embodiments, the method further comprises the step of providing a plasticizer comprising tris(chloropropyl)phosphate. In one embodiment, the step of spraying is further defined as spraying the isocyanate component, isocyanate-reactive component, isocyanurate catalyst component, carbodiimide catalyst component, and the plasticizer onto the surface to form the rigid foam on the surface.

It is to be appreciated that many changes can be made to the following examples, while still obtaining like or similar results. Accordingly, the following examples, illustrating embodiments of the rigid foam of the present invention, are intended to illustrate and not to limit the invention.

EXAMPLES

A series of rigid foams (Foams 1-8) are formed according to the present invention. A series of comparative rigid foams (Comp Foams 1 and 2) are also formed but not according to this invention. The Comp Foams 1 and 2 are not formed using the carbodiimide catalyst component of this invention. The isocyanate-reactive component and the isocyanate component, along with the reaction conditions used to form the Foams 1-8 and the Comp Foams 1 and 2, and the resulting physical properties are set forth in Table 1 below.

TABLE 1

| | Comp Foam 1 | Comp Foam 2 | Foam 1 | Foam 2 | Foam 3 | Foam 4 | Foam 5 | Foam 6 | Foam 7 | Foam 8 |
|---|---|---|---|---|---|---|---|---|---|---|
| Isocyanate-Reactive Component | | | | | | | | | | |
| Polyester Polyol | 66.67 | 58.3 | 62.02 | 57.7 | 57.7 | 56.25 | 56.25 | 56.25 | 46.28 | 46.28 |
| Mannich Polyol | — | 15.47 | — | 15.3 | 15.3 | 15.37 | 15.37 | 15.37 | 15.37 | 15.37 |
| Chain Extender | 12.5 | 3.09 | 11.63 | 3 | 3 | 3 | 3 | 3 | 6 | 6 |
| Plasticizer | — | — | — | — | — | — | — | — | 5 | 5 |
| Polymerization Catalyst | 1.67 | 1.55 | 1.55 | 1.5 | 1.5 | 1.49 | 1.49 | 1.49 | 1.49 | 1.49 |
| Silicone Surfactant | 6.67 | 3.09 | 6.2 | 3 | 3 | 2.98 | 2.98 | 2.98 | 3 | 3 |
| Isocyanurate Catalyst | 8.33 | 5.15 | 7.75 | 5 | 5 | 4.99 | 4.99 | 4.99 | 5 | 5 |
| Blowing Catalyst | — | 2.06 | — | 2 | 2 | 2 | 2 | 2 | 2 | 2 |
| Carbodiimide Catalyst | — | — | 2.37 | 0.51 | 0.51 | 1.02 | 1.02 | 1.02 | 1.02 | 1.02 |

TABLE 1-continued

| | Comp Foam 1 | Comp Foam 2 | Foam 1 | Foam 2 | Foam 3 | Foam 4 | Foam 5 | Foam 6 | Foam 7 | Foam 8 |
|---|---|---|---|---|---|---|---|---|---|---|
| Solvent | — | — | 4.6 | 0.99 | 0.99 | 1.97 | 1.97 | 1.97 | 3.84 | 3.84 |
| Blowing Agent | — | 9.29 | — | 9 | 9 | 8.93 | 8.93 | 8.93 | 9 | 9 |
| Water | 4.17 | 2 | 3.88 | 2 | 2 | 2 | 2 | 2 | 2 | 2 |
| Isocyanate Component | | | | | | | | | | |
| Isocyanate 1 | — | — | — | 240 | — | 240 | — | — | 240 | — |
| Isocyanate 2 | — | — | — | — | — | — | 240 | — | — | — |
| Isocyanate 3 | 417 | 240 | 388 | — | 240 | — | — | 240 | — | 240 |
| Reaction Conditions | | | | | | | | | | |
| Isocyanate Index | 300 | 239 | 300 | 194 | 192 | 247 | 245 | 243 | 197 | 193 |
| Application Temperature (° F.) | 70 | 120 to 160 | 70 | 120 to 180 | 120 to 180 | 160 | 120 to 180 | 140 to 180 | 120 to 180 | 150 to 160 |
| Physical Properties | | | | | | | | | | |
| Density (pcf) | 3.6 | 3.6 | 3.0 | 2.18 | 2.18 | 3.0 | 1.78 | 2.27 | 2.6 | 2.7 |
| Rise Time (s) | 24 | 0.5 | 11 | 0.5 | 0.5 | 0.5 | 0.5 | 0.5 | 0.5 | 0.5 |
| Tack-Free Time (s) | 13 | 3 | 12 | 2 | 2 | 2 | 2 | 2 | 3 | 3 |
| Cracking | No | No | Yes | Yes | Yes | No | Yes | Yes | No | No |
| Creep | No | No | No | Yes | Yes | Yes | No | No | Yes | No |
| Adhesion | Good | Good | Poor | Poor | Poor | Poor | Poor | Good | Poor | Good |
| Flame Spread Index Value | — | — | — | — | — | — | — | — | — | 25 |
| Smoke Developed Value | — | — | — | — | — | — | — | — | — | 450 |

Polyester Polyol is a modified phthalic acid ester having a hydroxyl number of 305 mg KOH/g, a nominal functionality of 2.2, and a dynamic viscosity of 5,500 cps at 25° C.
Mannich Polyol is a polyether polyol having an amine value of 165.5 mg KOH/g, a hydroxyl number of 470 mg KOH/g, a nominal functionality of 4, and a dynamic viscosity of 10,000 cps at 25° C.
Chain Extender comprises dipropylene glycol.
Plasticizer comprises tris(chloropropyl) phosphate.
Polymerization Catalyst comprises dimethylethanolamine.
Silcone Surfactant comprises polysiloxane.
Isocyanurate Catalyst comprises 1,3,5-tris(3-(dimethylamino)propyl)-hexahydro-s-triazine.
Blowing Catalyst comprises bis(2-dimethylaminoethyl)ether.
Carbodiimide Catalyst comprises 3-methyl-1-phenyl-2-phospholene-1-oxide.
Solvent comprises triethyl phosphate.
Blowing Agent comprises 1,1,1,3,3-pentafluoropentane (HFC-245fa).
Isocyanate 1 comprises about 59 parts by weight of 4,4'-MDI, about 3 parts by weight of 2,4'-MDI, and about 28 parts by weight of PMDI, each based on 100 parts by weight of the isocyanate. Isocyanate 1 has a dynamic viscosity of about 70 cps at 25° C.
Isocyanate 2 comprises about 38 parts by weight of 4,4'-MDI, about 3 parts by weight of 2,4'-MDI, and about 59 parts by weight of PMDI, each based on 100 parts by weight of the isocyanate. Isocyanate 2 has a dynamic viscosity of about 200 cps at 25° C.
Isocyanate 3 comprises about 28 parts by weight of 4,4'-MDI, about 3 parts by weight of 2,4'-MDI, and about 69 parts by weight of PMDI, each based on 100 parts by weight of the isocyanate. Isocyanate 3 has a dynamic viscosity of about 700 cps at 25° C.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims.

In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both singly and multiply dependent, is herein expressly contemplated.

What is claimed is:

1. A rigid foam having increased flame retardance, said rigid foam comprising the reaction product of:
   an isocyanate component having isocyanate functional groups and comprising from about 65 to about 75 parts by weight of a polymethylene polyphenyl polyisocyanate, from about 25 to about 35 parts by weight of a 4,4'-diphenylmethane diisocyanate, and from about 0.1 to about 10 parts by weight of a 2,4'-diphenylmethane diisocyanate, each based on 100 parts by weight of said isocyanate component; and
   an isocyanate-reactive component having isocyanate-reactive functional groups and comprising a Mannich polyol;
   in the presence of;
      an isocyanurate catalyst component for forming at least one isocyanurate moiety, said isocyanurate catalyst component comprising 1,3,5-tris(3-(dimethylamino)propyl)-hexahydro-s-triazine; and
      a carbodiimide catalyst component for forming at least one carbodiimide moiety, said carbodiimide catalyst component comprising 3-methyl-1-phenyl-2-phospholene-1-oxide;
   wherein said isocyanate component, isocyanate-reactive component, isocyanurate catalyst component, and carbodiimide catalyst component form a mixture prior to reacting to form said rigid foam with said mixture having a rise time of no greater than about 3 seconds.

2. A rigid foam as set forth in claim 1 having:
   i) a flame spread index value of no greater than 25 as measured according to ASTM Designation E84-10;
   ii) a smoke developed value of no greater than 450 as measured according to ASTM Designation E84-10; or
   iii) both i) and ii).

3. A rigid foam as set forth in claim 1, wherein:
   i) at least two of said isocyanate functional groups self-react in the presence of said isocyanurate catalyst component to form said at least one isocyanurate moiety;
   ii) at least two of said isocyanate functional groups self-react in the presence of said carbodiimide catalyst component to form said at least one carbodiimide moiety; or
   iii) both i) and ii).

4. A rigid foam as set forth in claim 1, wherein said isocyanurate catalyst component is utilized in an amount of from about 0.1 to about 20 parts by weight based on 100 parts by weight of said isocyanate component.

5. A rigid foam as set forth in claim 1, wherein said carbodiimide catalyst component is utilized in an amount of from about 0.1 to about 20 parts by weight based on 100 parts by weight of said isocyanate component.

6. A rigid foam as set forth in claim 1, wherein said carbodiimide catalyst component further comprises triethyl phosphate.

7. A rigid foam as set forth in claim 6 wherein said 3-methyl-1-phenyl-2-phospholene-1-oxide is utilized in an amount of from about 10 to about 45 parts by weight and said triethyl phosphate is utilized in an amount of from about 55 to about 90 parts by weight, each based on 100 parts by weight of said carbodiimide catalyst component.

8. A rigid foam as set forth in claim 1, wherein said isocyanate-reactive component further comprises a polyester polyol.

9. A rigid foam as set forth in claim 1 wherein said Mannich polyol is utilized in an amount of from about 1 to about 30 part(s) by weight based on 100 parts by weight of said isocyanate-reactive component.

10. A rigid foam as set forth in claim 8 wherein said polyester polyol is utilized in an amount of from about 35 to about 75 parts by weight based on 100 parts by weight of said isocyanate-reactive component.

11. A rigid foam as set forth in claim 1, wherein:
   i) said isocyanate component has a dynamic viscosity of from about 0.001 to 2.5 Pa*s at 25° C. (or from about 1 to about 2500 cps at 25° C.); and/or
   ii) said isocyanate component and said isocyanate-reactive component are reacted at an isocyanate index of from about 100 to about 500; and/or
   iii) said rigid foam is formed from spraying; and/or
   iv) said rigid foam has a density of from about 1 to about 81 kilogram(s) per cubic meter (or from about 0.1 to about 5 pound(s) per cubic foot).

12. A rigid foam as set forth in claim 1 further comprising a plasticizer, wherein said plasticizer:
   i) is tris(chloropropyl) phosphate;
   ii) is utilized in an amount of from about 1 to about 50 based on 100 parts by weight of the isocyanate-reactive component; or
   iii) both i) and ii).

13. A rigid foam having increased flame retardance and comprising the reaction product of:
   an isocyanate component having isocyanate functional groups and comprising;
      from about 65 to about 75 parts by weight based on 100 parts by weight of the isocyanate component of a polymethylene polyphenyl polyisocyanate,
      from about 25 to about 35 parts by weight based on 100 parts by weight of the isocyanate component of a 4,4'-diphenylmethane diisocyanate, and
      from about 0.1 to about 10 parts by weight based on 100 parts by weight of the isocyanate component of a 2,4'-diphenylmethane diisocyanate, and
   an isocyanate-reactive component having isocyanate-reactive functional groups and comprising;
      a polyester polyol, and
      a Mannich polyol,
   in the presence of;
      an isocyanurate catalyst component for forming at least one isocyanurate moiety, said isocyanurate catalyst component comprising 1,3,5-tris(3-(dimethylamino)propyl)-hexahydro-s-triazine; and
      a carbodiimide catalyst component for forming at least one carbodiimide moiety, said carbodiimide catalyst component comprising 3-methyl-1-phenyl-2-phospholene-1-oxide;
   wherein said isocyanate component, isocyanate-reactive component, isocyanurate catalyst component, and carbodiimide catalyst component form a mixture prior to curing to form said rigid foam with said mixture having a rise time of no greater than about 3 seconds and a tack-free time of no greater than about 120 seconds; and wherein said rigid foam has a flame spread index value of no greater than 25 and a smoke developed value of no greater than 450, each as measured according to ASTM Designation E84-10.

14. A method of forming a rigid foam on a surface, the rigid foam having increased flame retardance and comprising the reaction product of an isocyanate component and an isocyanate-reactive component in the presence of an isocyanurate catalyst component and a carbodiimide catalyst component, said method comprising the steps of:
   providing the isocyanate component having isocyanate functional groups and comprising from about 65 to about 75 parts by weight of a polymethylene polyphenyl polyisocyanate, from about 25 to about 35 parts by weight of a 4,4'-diphenylmethane diisocyanate, and from 0.1 to about 10 parts by weight of a 2,4'-diphenylmethane diisocyanate, each based on 100 parts by weight of the isocyanate component;
   providing the isocyanate-reactive component having isocyanate-reactive functional groups;
   providing the isocyanurate catalyst component for forming at least one isocyanurate moiety, the isocyanurate catalyst component comprising 1,3,5-tris(3-(dimethylamino)propyl)-hexahydro-s-triazine;
   providing the carbodiimide catalyst component for forming at least one carbodiimide moiety, the carbodiimide catalyst component comprising 3-methyl-1-phenyl-2-phospholene-1-oxide; and
   spraying the isocyanate component, isocyanate-reactive component, tris(chloropropyl) phosphate, isocyanurate catalyst component, and carbodiimide catalyst component onto the surface to form the rigid foam having a rise time of no greater than about 3 seconds on the surface.

15. A method as set forth in claim 14 wherein the step of spraying the isocyanate component, isocyanate-reactive component, isocyanurate catalyst component, and carbodiimide catalyst component is further defined as spraying at a pressure of from 0 to about 13800 kPa (or from 0 to about 2000 psi).

16. A method as set forth in claim 14, wherein said method further comprises the step of combining the isocyanate component, isocyanate-reactive component, isocyanurate catalyst component, and carbodiimide catalyst component to form a mixture.

17. A method as set forth in claim 16 wherein
   the mixture has a tack-free time of no greater than about 120 seconds.

18. A method as set forth in claim 14, wherein said method further comprises the step of providing a plasticizer comprising tris(chloropropyl) phosphate and wherein the step of spraying is further defined as spraying the isocyanate component, isocyanate-reactive component, isocyanurate catalyst component, carbodiimide catalyst component, and plasticizer onto the surface to form the rigid foam on the surface.

19. A method of forming a rigid foam on a surface, the rigid foam having increased flame retardance and comprising the reaction product of an isocyanate component and a isocyanate-reactive component in the presence of an isocyanurate catalyst component and a carbodiimide catalyst component, said method comprising the steps of:
   providing the isocyanate component having isocyanate functional groups and comprising;
      from about 65 to about 75 parts by weight based on 100 parts by weight of the isocyanate component of a polymethylene polyphenyl polyisocyanate,
      from about 25 to about 35 parts by weight based on 100 parts by weight of the isocyanate component of a 4,4'-diphenylmethane diisocyanate, and
      from about 0.1 to about 10 parts by weight based on 100 parts by weight of the isocyanate component of a 2,4'-diphenylmethane diisocyanate, and
   providing the isocyanate-reactive component having isocyanate-reactive functional groups and comprising;
      a polyester polyol, and
      a Mannich polyol;
   providing the isocyanurate catalyst component for forming at least one isocyanurate moiety, the isocyanurate catalyst component comprising 1,3,5-tris(3-(dimethylamino)propyl)-hexahydro-s-triazine;
   providing the carbodiimide catalyst component for forming at least one carbodiimide moiety, the carbodiimide catalyst component comprising 3-methyl-1-phenyl-2-phospholene-1-oxide; and
   spraying the isocyanate component, isocyanate-reactive component, isocyanurate catalyst component, and carbodiimide catalyst component onto the surface at a pressure of from 0 to about 13800 kPa (or from 0 to about 2000 psi) to form the rigid foam on the surface;
   wherein the isocyanate component, isocyanate-reactive component, isocyanurate catalyst component, and carbodiimide catalyst component form a mixture having a rise time of no greater than about 3 seconds and a tack-free time of no greater than about 120 seconds; and
   wherein the rigid foam has a flame spread index value of no greater than 25 and a smoke developed value of no greater than 450, each as measured according to ASTM Designation E84-10.

* * * * *